E. J. VON HENKE.
WELDING HIGH SPEED STEEL.
APPLICATION FILED MAY 14, 1917.

1,253,189.

Patented Jan. 8, 1918.

Inventor
Edmund J. Von Henke
By his Attorneys

UNITED STATES PATENT OFFICE.

EDMUND J. von HENKE, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

WELDING HIGH-SPEED STEEL.

1,253,189.  Specification of Letters Patent.  Patented Jan. 8, 1918.

Application filed May 14, 1917.  Serial No. 168,334.

*To all whom it may concern:*

Be it known that I, EDMUND J. VON HENKE, a citizen of the United States, and a resident of Lynn, in the county of Essex and State of Massachusetts, have invented certain new and useful Improvements in Welding High-Speed Steel, of which the following is a specification.

My invention relates to a method of electrically welding a flat piece of high-speed steel to a flat piece of other metal such as machinery steel.

The object of the invention is to overcome the difficulties heretofore experienced in the welding of the two flat surfaces together to produce a satisfactory weld.

My present invention consists in modifying the contacting flat surfaces, placing them together in a certain relation, and then effecting the weld as hereinafter more particularly described and claimed.

In the accompanying drawings Figure 1 is a cross-section of the two pieces as assembled preparatory to the welding operation.

Figure 1:
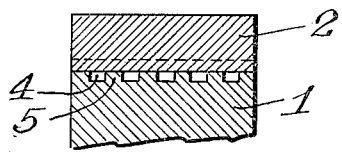

In the drawings 1 indicates a piece of high-speed steel and 2 the piece of machinery steel or other metal to which it is to be welded along the surface.

According to my present invention, I provide the contacting surfaces of both pieces with alternate grooves and projections 4, 5 which, for good results, may be approximately one-eighth inch wide. Both pieces being thus grooved, the parts are laid upon one another crosswise, that is to say with the ribs or projections of the high-speed steel lying across the ribs or projections of the machinery steel. In this way a multitude of small contacts of high resistance distributed all over the surface to be welded are provided whereby the heating is distributed all over the flat face and a uniform and homogeneous weld is accomplished between the two pieces.

Figure 2:
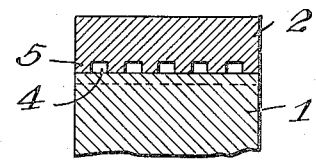
Fig. 2 is a cross-section of the same at right angles to the section Fig. 1.
Figure 3:
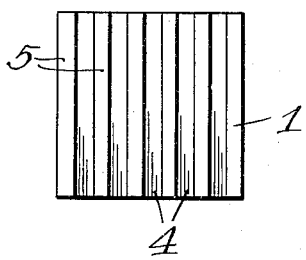
Fig. 3 is a plan of the flat surface of one of said pieces as modified according to my present invention.
Figure 4:
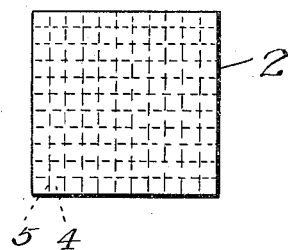
Fig. 4 is a plan showing by dotted lines the alternate grooves and projections of the two pieces when assembled.

It will be understood that in the operation the parts assembled as shown in Figs. 1 and 2 are simply placed between the electrodes or abutments of an electric welding machine adapted to supply current of the required amount and are then forced together as in the ordinary electric welding operation.

While I have described projections and grooves one-eighth of an inch wide I do not limit myself to this particular dimension as the same may be varied provided that the contacts are sufficiently numerous to effect an approximate distribution of the heat evenly all over the face, thereby securing a substantially homogeneous weld by a coalescence of the numerous small and closely adjacent points of heating, softening and welding.

What I claim as my invention is:

The improved method of welding a flat piece of high-speed steel to the flat surface of another piece of metal consisting in providing the contacting surfaces with alternate grooves and projections of such dimensions that when the parts are laid crosswise a multitude of small contacts of high resistance distributed all over the surface to be welded will be provided so as to distribute the heat all over the flat surface, assembling the parts with said projections lying crosswise in contact and then applying the electric heating current to form a uniform and homogeneous weld as and for the purpose described.

Signed at New York, in the county of New York and State of New York, this 12th day of May, A. D. 1917.

EDMUND J. von HENKE.

Witnesses:
F. B. TOWNSEND,
IRENE LEFKOWITZ.